United States Patent [19]

Matsuda et al.

[11] 4,393,388

[45] Jul. 12, 1983

[54] LIQUID DROPLET PROJECTION APPARATUS

[75] Inventors: Yasumasa Matsuda, Hitachi; Kyoji Mukumoto, Katsuta; Syoji Sagae, Hitachiota; Masatoshi Kasahara, Hitachi, all of Japan

[73] Assignees: Hitachi Koki Co., Ltd.; Hitachi, Ltd., both of Tokyo, Japan

[21] Appl. No.: 242,185

[22] Filed: Mar. 10, 1981

[30] Foreign Application Priority Data

Mar. 10, 1980 [JP] Japan .................................. 55-29177

[51] Int. Cl.[3] .............................................. G03B 15/18

[52] U.S. Cl. .............................................. 346/140 R

[58] Field of Search ............... 346/140 PD, 140 R, 75

[56] References Cited

U.S. PATENT DOCUMENTS 3,946,398 3/1976 Kyser et al. ....................... 346/75 X 4,245,224 1/1981 Isayama et al. .............. 346/140 PD 4,266,232 5/1981 Juliana et al. ................ 346/140 PD

*Primary Examiner*—Joseph W. Hartary

*Assistant Examiner*—W. J. Brady

*Attorney, Agent, or Firm*—Craig and Antonelli

[57] ABSTRACT

A liquid droplet projection apparatus is disclosed which comprises a nozzle arranged at a liquid droplet ejection head, a liquid droplet supply tank, and an electro-mechanical transducer section interposed on the head between the nozzle and the tank. The volume of the electro-mechanical converter means changes in volume in response to an electrical signal pulse applied thereto to cause the nozzle to eject liquid droplets in accordance with the electrical signal. When the pattern of the electrical signal applied to the electromechanical transducer section has an interruption period longer than a predetermined width and three or more successive electrical signals following the interruption period, the amplitude and/or width of the second one of the successive electrical signals is enlarged as compared with the amplitude and/or width of the other electrical signals, thus preventing the diameter of the second liquid droplet ejected following the interruption from being reduced.

3 Claims, 10 Drawing Figures

LIQUID DROPLET PROJECTION APPARATUS

BACKGROUND OF THE INVENTION

1. Field of the Invention

The present invention realtes to a liquid droplet projection apparatus used for an ink jet printer and the like, and in particular to a liquid droplet projection apparatus in which liquid droplets are ejected from a nozzle by changing the volume of electro-mechanical transducer means in accordance with an electrical signal.

2. Description of the Prior Art

In conventional liquid droplet projection apparatuses of this type such as disclosed in U.S. Pat. No. 3,946,398, a liquid such as ink is supplied from a liquid supply tank into a liquid droplet projection head through a liquid conduction tube.

When a piezo-electric element of the electromechanical transducer means is impressed with an electrical signal thereby to excite the piezo-electric element under the condition that the liquid is filled in the nozzle of the liquid droplet projection head, the electro-mechanical transducer means and a common liquid tank, the body with the piezo-electric element bonded thereto is displaced so that the volume of the electro-mechanical transducer means is sharply reduced, thus ejecting liquid droplets from the nozzle by the resultant pressure wave.

The piezo-electric element of the liquid droplet projection head of these conventional types of liquid droplet projection apparatuses is generally supplied with an electrical signal of a fixed amplitude and a fixed pulse width to eject the liquid droplets.

In the case where ejection of the liquid droplets from the nozzle is suspended or interrupted followed by resumption of ejection and also the period of the interruption is longer than twice the period of the electrical signal which is applied to the piezo-electric element, and of which the driving frequency is high, then some droplets ejected from the nozzle after the interruption are larger in radius and other droplets are smaller than normal for unexplained reasons. This change in droplet size by the operating conditions of the devices in spite of a fixed electrical signal applied for generating uniform liquid droplets of a predetermined size, has been found to reduce the quality of characters and patterns recorded by these various sizes of droplets.

In particular, the degradation of the quality of the record due to the reduction in the radius of droplets is so great that if the droplets disappear, the characters may become difficult to be deciphered.

SUMMARY OF THE INVENTION

Accordingly, it is an object of the present invention to provide a liquid droplet projection apparatus in which a recorded image of high recording quality is capable of being produced by reducing the variations of the diameter of the droplets ejected from the nozzle.

According to the present invention, there is provided a liquid droplet projection apparatus in which if the pattern of the electrical signal applied to the piezo-electric element of the electromechanical transducer means has an interruption period longer than a predetermined width followed by three successive electrical signals, at least one of the amplitude and width of the second one of the three electrical signals is enlarged as compared with the amplitude and width of the other two electrical signals, thereby preventing the reduction in radius of the second droplet ejected after the interruption.

BRIEF DESCRIPTION OF THE DRAWINGS

FIGS. 8*a* and 8*b* are diagrams showing the relation between the electrical signal applied successively and the size of the droplets generated thereby, in which FIG. 8*a* shows a diagram for explaining and showing the diameter of the liquid droplet generated and a waveform of the electrical signal produced in a conventional apparatus, and FIG. 8*b* shows a diagram for explaining and showing the diameter of the liquid droplets and a waveform of the electrical signal produced according to the present invention.

DESCRIPTION OF THE PREFERRED EMBODIMENTS

The present invention will be described below with reference to the embodiments shown in the attached drawings.

Figure 1:
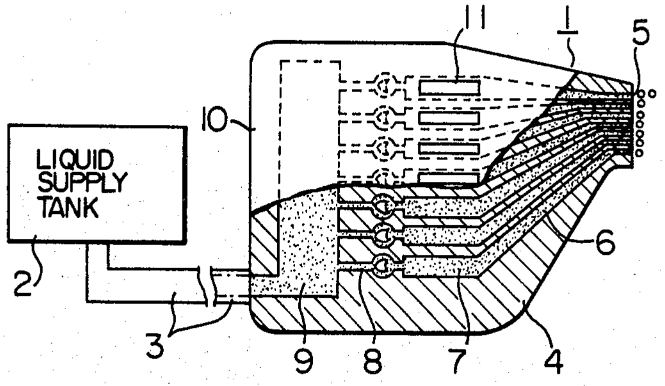
FIG. 1 is a partly-cutaway plan view of the essential parts of a liquid droplet projection apparatus according to the present invention.
Figure 2:
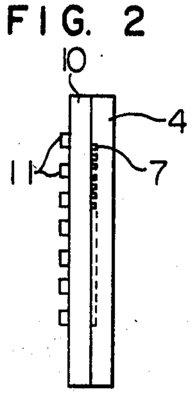
FIG. 2 is a side view thereof.

The diagrams of FIGS. 1 and 2 are respectively a partly-cutaway plan view of the essential parts of a liquid droplet projection apparatus according to the present invention and a right side view thereof. In the drawings, the liquid droplet projection apparatus comprises a liquid droplet ejection head 1, a liquid supply tank 2 and a liquid introducing tube 3 connecting the tank to the head. The liquid ejection head 1 includes a liquid droplet ejection nozzle 5 formed of grooves on a side thereof, a liquid conducting section 6, an electro-mechanical transducer section 7, a liquid conducting section 8 and a common liquid reservoir or tank 9, all of which make up a body 4, and a cover member 10 coupled to the body 4 in a manner to cover the grooves. Each of the piezo-electric element 11 is bonded to the part of the surface of the cover 10 corresponding to each electro-mechanical transducer section 7 of the body 4.

The liquid is supplied from the liquid supply tank 2 through the liquid conducting tube 3 into the liquid droplet injection head 1. When the nozzle 5, the liquid conducting sections 6 and 8, the electromechanical transducer section 7 and the common liquid tank 9 of the liquid droplet projection head 1 are filled with the liquid, an electrical signal is applied to the piezo-electric elements 11 thereby to excite the same. Thus, the body 4 to which the piezo-electric element is bonded becomes flexed so that the volume of the electro-mechanical transducer section 7 is sharply reduced, and the resulting pressure wave causes liquid droplets to be ejected from the nozzle 5.

Figure 3:
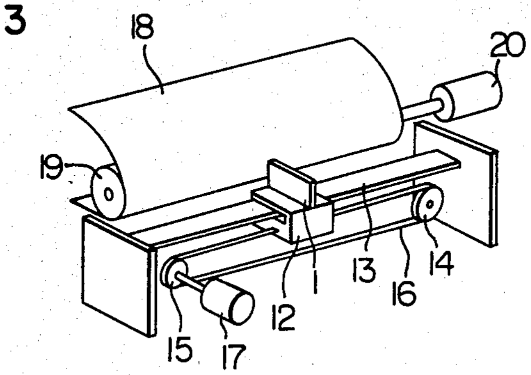
FIG. 3 is a perspective view of an ink jet printer using the droplet projection apparatus shown in FIG. 1.

The liquid droplet projection apparatus of this type is used with an ink jet printer or the like as shown in FIG. 3. The liquid droplet ejection head 1 is supported on a support 12 slidably disposed on a rail 13, and to the support 12 is fixed the timing belt 16 which is in turn suspended on and between two pulleys 14 and 15. The timing belt 16 is driven by a belt scan motor 17 through a pulley 15 so that the head is reciprocated laterally. The recording paper 18, on the other hand, is adapted to be fed in a direction substantially perpendicular to the direction of movement of the liquid droplet ejection head 1 by driving the paper feed roller 19 with the paper feed motor 20.

While moving the liquid droplet ejection head 1 along the rail 13 by the belt scan motor 17, droplets, that is, ink particles are ejected from the head 1 thereby to record letters, symbols, pictures or the like on the recording paper 18. Upon completion of recording of one line, the recording paper 18 is fed by the paper feeding motor 20, so that the liquid droplet ejection head 1 is again moved similarly to perform the recording operation.

Figure 4:
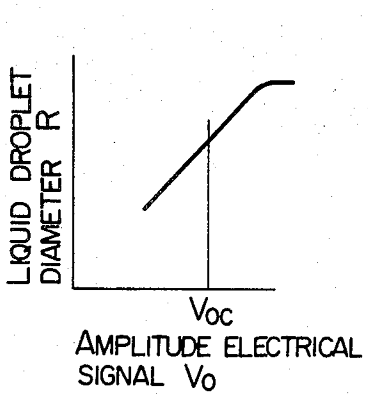
FIG. 4 is a graph showing the relation between the amplitude, of the electrical signal applied to the piezo-electric element and the diameter of a droplet.
Figure 5:
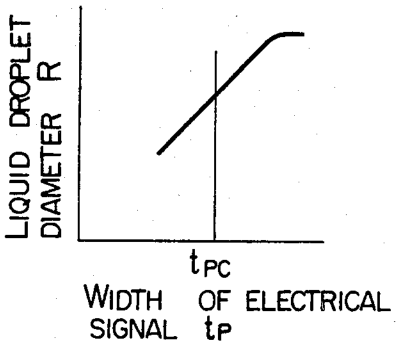
FIG. 5 is a graph showing the relation between the width of the electrical signal and the diameter of a liquid droplet.

The graphs of FIGS. 4 and 5 show the relation between the magnitude Vo of the electrical signal applied to the piezo-electric element 11 and the diameter R of the liquid droplet, and the relation between the width $t_p$ of the electrical signal applied to the piezo-electric element 11 and the diameter of the liquid droplet, respectifely.

As seen from these graphs, it is possible to change the diameter R of the liquid droplets proportionately by changing the voltage Vo or width $t_p$ of the electrical signal by utilizing the rectilinear portion of the characteristic lines. In these graphs, reference characters Voc and $t_{pc}$ show center points of change of the linear part of the magnitude Vo and width $t_p$, respectively.

Figure 6:
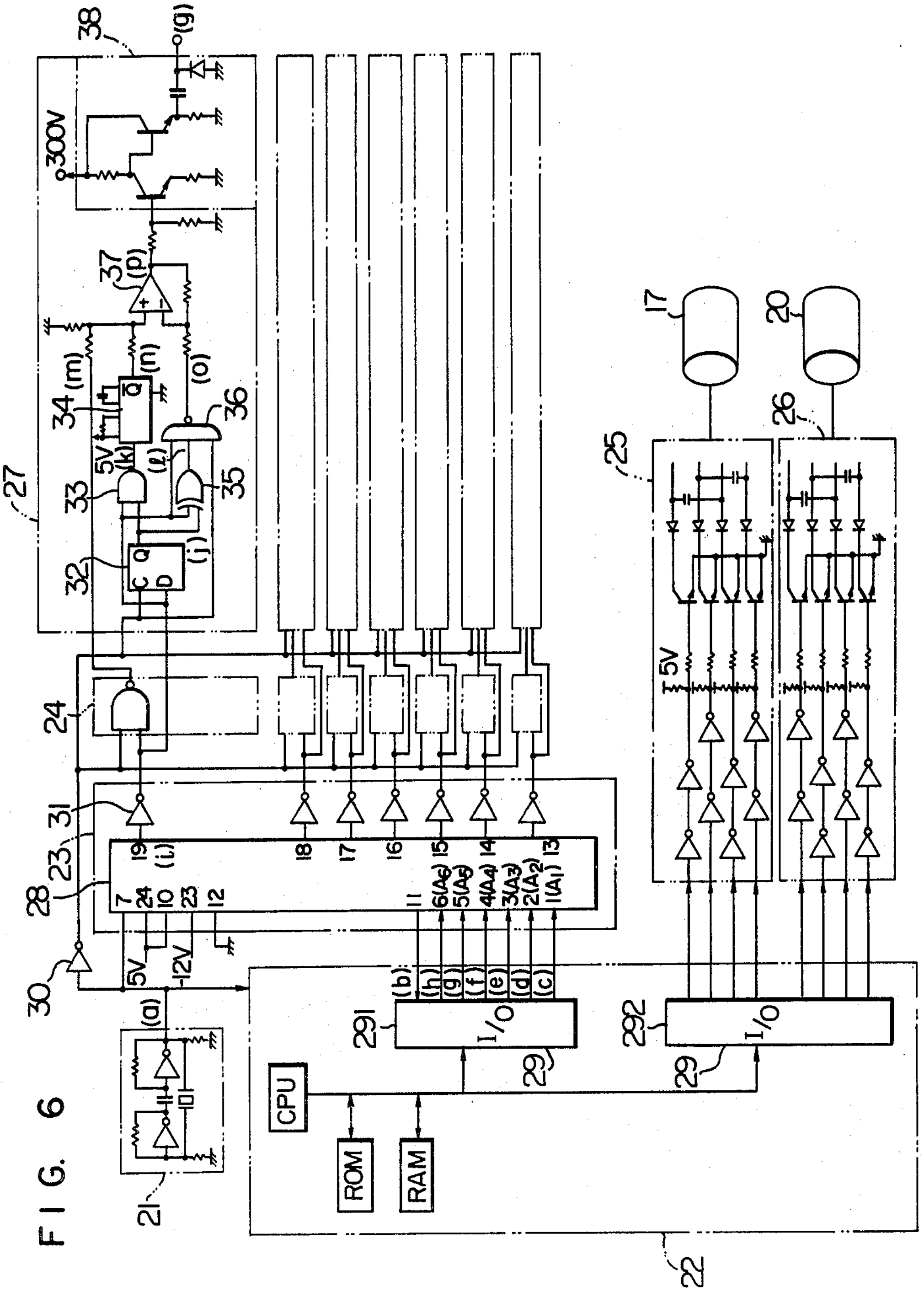
FIG. 6 is a block diagram showing a control circuit according to an embodiment of the present invention.
Figure 7:
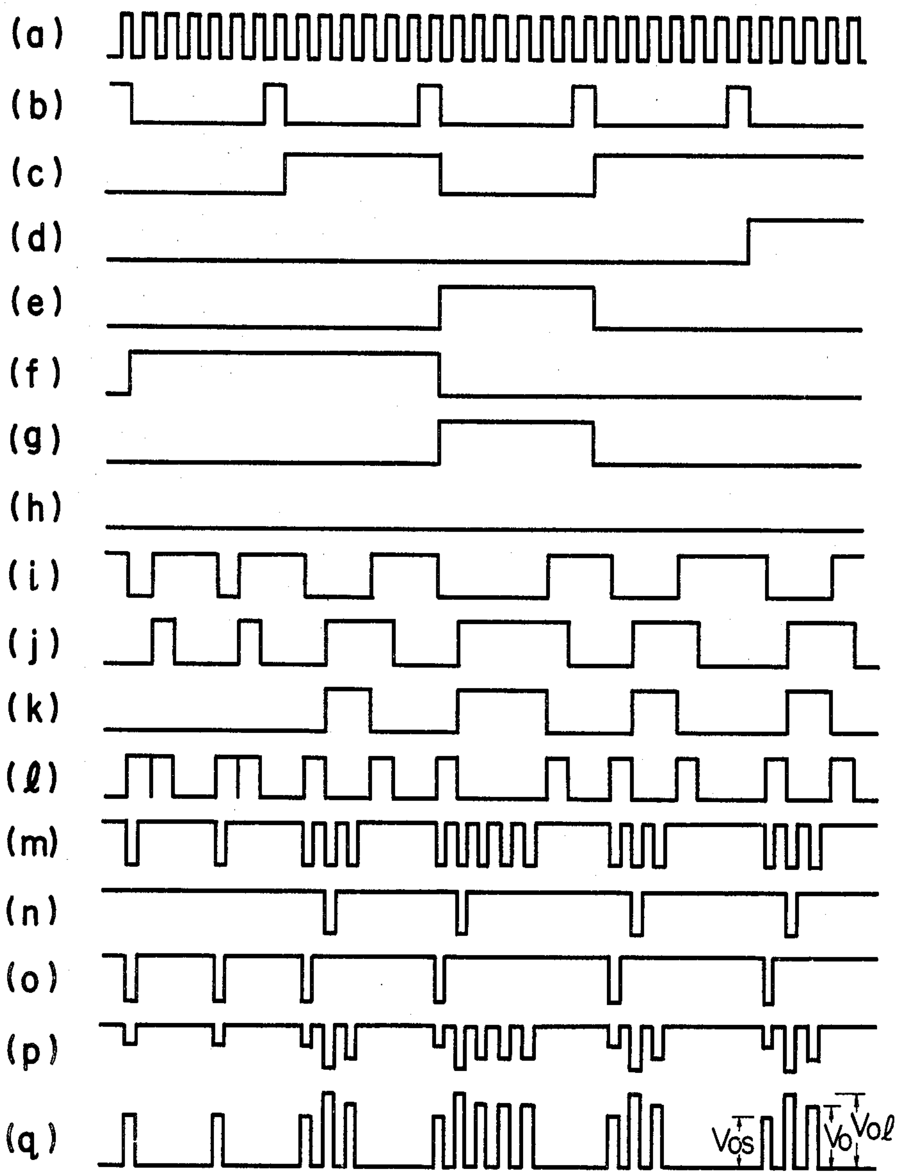
FIG. 7 shows signal waveforms produced at the essential parts of the control circuit of FIG. 6.

The diagrams of FIG. 6 and 7 show a block diagram of a control circuit of a liquid droplet projection apparatus having liquid droplet diameter corrector means according to an embodiment of the present invention, and output waveforms produced at the essential parts thereof, respectively.

An output of the reference clock pulse generator 21 for determining the frequency of droplet ejection is shown in FIG. 7(*a*). This clock signal is supplied to a printing controller 22 comprised of a microcomputer and a character pattern generating memory comprised of a character generator 28.

The product Model HD-46800 of Hitachi Ltd. may be used as the microcomputer, which generally comprises, as shown, a micro-processor CPU, a read-only memory ROM, a random access memory RAM and an input-output interface 29.

The character generator 28, on the other hand, may be Model MK2302P of the product by Mostek Corp., and is so constructed that a predetermined output signal is produced at output terminals 13 to 19 in response to input signals applied from the input-output interface 291 of the controller 22 to the input terminals 1 to 6 of the character generator 28.

When signals as shown in FIGS. 7(*c*) to 7(*h*) are applied to the input terminals 1 to 6 of the character generator 28, a signal as shown in FIG. 7(*i*) is produced at the output terminal 19. The output signal at the output terminal 19 and the clock signal are inverted through inverters 30 and 31 respectively and applied to the gate circuit 24. The output signal of this gate circuit 24 is shown in FIG. 7(*m*). This signal is for deciding the number of electrical signals that should exist between adjacent pulses shown in FIG. 7(*b*). In this embodiment, a maximum of five pulses are required.

The output signal of the output terminal 19, on the other hand, is applied through an inverter 31 to a D input terminal of a D flip-flop 32 of a variable amplifier 27. The output signal from this flip-flop 32 is applied through an AND gate 33 to a monostable multivibrator 34. Further, the output signal of the flip-flop 32 is applied through an exclusive OR gate 35 to a NAND gate 36.

The output signal of the NAND gate 36 (FIG. 7(*o*)), the output signal of the monostable multivibrator 34 (FIG. 7(*n*)) and the output signal of the gate circuit 24 (FIG. 7(*m*)) are compared with each other and amplified at the comparing amplifier 37, thereby producing the output signal as shown in FIG. 7(*p*). This signal is amplified at the amplifier circuit 38 so that the output signal as shown in FIG. 7(*q*) is applied to the first one of the piezo-electric elements 11 of the liquid droplet ejection head 1.

The gate circuits 24 and the variable amplifiers 27 connected with the other output terminals 13 to 18 of the character generator 28 are similarly constructed and are adapted to excite the corresponding ones of the piezo-electric elements 11, respectively.

Thus seven nozzles are juxtaposed at the droplet ejection head 1 and if each nozzle 5 is excited by five electrical signals for each period, one character is comprised of a matrix of 5 by 7.

The printing controller 22 has an input-output interface 292 for controlling the scan motor 17 and the paper feeding motor 20. The output of the input-output interface 292 is amplified at the driver circuits 25 and 26 respectively thus making it possible to control the motors 17 and 20 independently of each other.

Figure 8A:
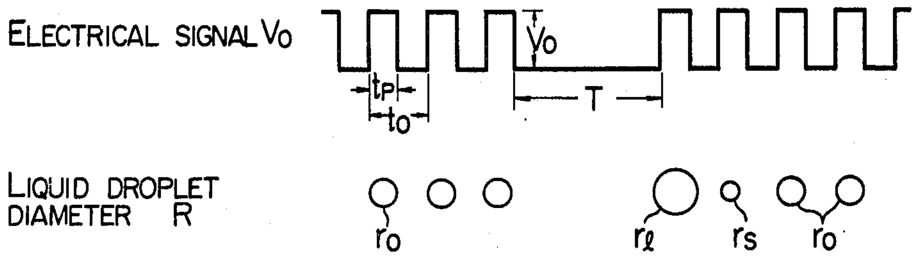
FIG. 8a PRIOR ART
Figure 8B:
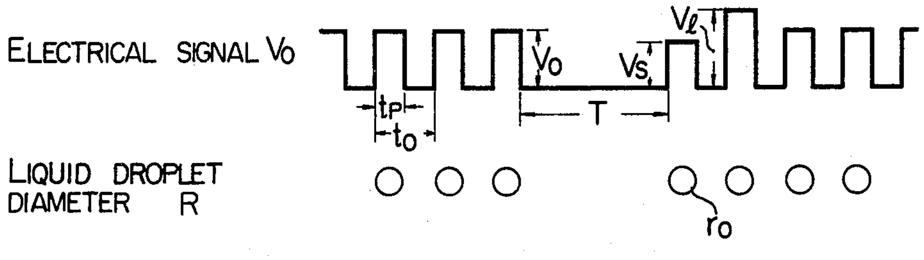

The diagrams of FIGS. 8*a* and 8*b* show the relation between the electrical signal applied successively to one piezo-electric element 1 and the size of the liquid droplet ejected from the nozzle 5. The diagram of FIG. 8*a* shows the change of the diameter R of the liquid droplet with the application of an electrical signal having a predetermined amplitude and width. Also, FIG. 8*b* shows the relation between the electrical signal and the diameter of the liquid droplet when a signal q according to the present invention is applied.

In the shown diagrams, assume that an electrical signal Vo having a width $t_p$ and a period $t_o$ is repeatedly applied to the piezo-electric element 11 and then is provisionally suspended followed by resuming supply with the electrical signal after an interruption period of T. In the event that the interruption period T is twice or more longer than the period $t_o$ of the electrical signal, that is, if $T \geqq 2t_O$, then the radius R of the first droplet following the interruption becomes $r_l$ which is larger than the normal radius $r_O$, while the radius of the second liquid droplet following the interruption becomes $r_S$ which is smaller than the radius $r_O$.

According to the present invention, in contrast, assume that generation of n successive droplets is resumed following the interruption period T ($\geqq 2t_O$). As shown in FIG. 8*b*, the amplitude of the applied electrical signal associated with the first liquid droplet takes a value Vs smaller than the amplitude Vo of the electrical signal applied at the time of generation of successive liquid droplets, namely, normal liquid droplets. Further, the amplitude of the applied electrical signal associated with the second liquid droplet takes a value Vl larger than the amplitude Vo of the applied electrical signal for the normal liquid droplets. Furthermore, the amplitude of the applied electrical signals associated with the third and subsequent successive liquid droplets is controlled to take a value equal to the amplitude Vo of the applied electrical signal associated with the normal liquid droplets. In the case where the interruption period T is smaller than $2t_O$, the effect of the signal interruption on the possible change of the diameter of the liquid droplets is so small that the amplitude of each applied electrical signal associated with the successive liquid droplets following the interruption can be made constant at Vo.

By this control, the radius of the droplets generated from the liquid droplet ejection apparatus is always fixed, thus improving the recording quality of the characters, symbols, pictures and the like recorded on the recording paper.

In the above-mentioned embodiment, the diameter of the liquid droplets is corrected by controlling the amplitude Vo of the applied electrical signal. As an alternative to this method, it is also possible to correct the diameter of the liquid droplets by regulating the width $t_p$ of the applied electrical signal. In this case, the variable amplifier 27 used in the above-mentioned embodiment is replaced by a signal width variable circuit and an amplifier. This signal width variable circuit, as in the above-mentioned embodiment, is controlled by a command from the printing controller 22 thereby to change the width of the electrical signal applied to the piezoelectric element 11 through the amplifier from the gate circuit. The other parts of the configuration are the same as those of the above-mentioned embodiment.

Figure 9:
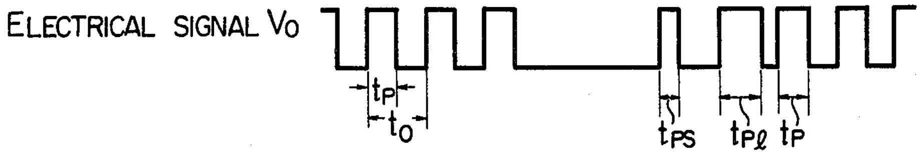
FIG. 9 is a waveform of a signal produced according to another embodiment of the present invention.

As shown in FIG. 9, assume that n successive liquid droplets are to be generated following the interruption period T ($\geqq 2t_O$). In this case, the signals are controlled in such a manner that the width of the applied electrical signal associated with the first liquid droplet takes a value $t_{ps}$ smaller than the width $t_p$ of the applied electrical voltage associated with the normal liquid droplets, that the width of the applied electrical signal associated with the second liquid droplet takes a value $t_{pl}$ larger than the width $t_p$ of the applied electrical signal associated with normal liquid droplets, and that the width of the applied electrical signals associated with the third and subsequent successive liquid droplets takes a value equal to the width $t_p$ of the applied electrical signal associated with normal droplets. In this way, as in the aforementioned embodiment, the radius of the liquid droplets generated from the liquid droplet projection apparatus is rendered always equal, thus improving the recording quality of the characters, symbols, pictures and the like recorded on the recording paper. In the case of the embodiment under consideration, if the interruption period T is smaller than $2t_O$, the width of the applied electrical signals associated with the successive droplets subsequent to the interruption are rendered constant at $t_p$.

In the aforementioned embodiment, the amplitude or width of the applied electrical signals associated with the first and second liquid droplets immediately following the interruption period is controlled in order to correct the radius of these liquid droplets. In view of the fact that the effect of the change in the diameter of the liquid droplet on the recording quality is largely attributable to the second liquid droplet after the interruption which is likely to decrease or disappear as explained above, however, the amplitude or width of the applied electrical signal associated with the second liquid droplet alone may be controlled thereby to correct the radius of the second liquid droplet to attain a considerable improvement in the recording quality.

It will be understood from the foregoing description that according to the present invention, in the case where liquid droplets are ejected successively after an interruption longer than a predetermined period of time, the reduction of the radius of the second liquid droplet following the interruption which most adversely affects the recording quality is prevented thereby to improve the recording quality.

We claim:

1. A liquid droplet projection apparatus comprising a liquid droplet ejection nozzle, a liquid supply tank, an electro-mechanical transducer section, interposed between said liquid supply tank and said liquid droplet ejection nozzle, for changing its volume in accordance with an electrical signal applied thereto to cause liquid droplets to be ejected from said liquid droplet ejection nozzle, and liquid droplet diameter corrector means in which when the pattern of said electrical signal applied to said electro-mechanical transducer section has an interruption period longer than a predetermined duration and at least three successive electrical signals are generated following said interruption period, said correction means changes at least selected one of the amplitude and width of the second one of said successive electrical signals to produce a corrected electrical signal which is larger in the selected one of the amplitude and width as compared with the corresponding one of the amplitude and width of the others of said electrical signals.

2. A liquid droplet projection apparatus according to claim 1, wherein said liquid droplet diameter corrector means generates said corrected electrical signal in the case where said interruption period is longer than twice the period of said pulse of said electrical signal to be applied to said electro-mechanical transducer section.

3. A liquid droplet projection apparatus according to claim 1, wherein said liquid droplet diameter corrector means includes means for reducing at least selected one of the amplitude and width of the first one of said successive electrical signals as compared with the corresponding one of the amplitude and width of the others of said successive electrical signals.

* * * * *